United States Patent
Sato

(10) Patent No.: US 6,897,685 B2
(45) Date of Patent: May 24, 2005

(54) DIFFERENTIAL DATA TRANSMITTER

(75) Inventor: Kiyohito Sato, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 10/649,734

(22) Filed: Aug. 28, 2003

(65) Prior Publication Data

US 2004/0113656 A1 Jun. 17, 2004

(30) Foreign Application Priority Data

Aug. 29, 2002 (JP) ........................................ 2002-250274

(51) Int. Cl.[7] .............................................. H03K 19/94
(52) U.S. Cl. .............................. 326/86; 326/90; 326/82
(58) Field of Search ............................. 326/82, 83, 86, 326/90, 93, 126, 127

(56) References Cited

U.S. PATENT DOCUMENTS 5,264,745 A * 11/1993 Woo ............................. 326/62
5,495,186 A 2/1996 Kanazawa et al.

* cited by examiner

Primary Examiner—Anh Q. Tran
(74) Attorney, Agent, or Firm—Oblon, Spivak, McClelland, Maier & Neustadt, P.C.

(57) ABSTRACT

A differential data transmitter includes a first pre-driver configured to receive a differential data signal, a delay circuit configured to receive the differential data signal in parallel with the first pre-driver, and output the differential data signal with a delay time, and a second pre-driver configured to receive an output signal from the delay circuit. The delay circuit is capable of changing the delay time in accordance with a control signal. An output driver is configured to receive first and second output signals from the first and second pre-drivers, and output a pre-emphasis waveform signal that corresponds to a subtraction signal between the first and second output signals.

18 Claims, 5 Drawing Sheets

DIFFERENTIAL DATA TRANSMITTER

CROSS-REFERENCE TO RELATED APPLICATIONS

This application is based upon and claims the benefit of priority from the prior Japanese Patent Application No. 2002-250274, filed Aug. 29, 2002, the entire contents of which are incorporated herein by reference.

BACKGROUND OF THE INVENTION

1. Field of the Invention

The present invention relates to a differential data transmitter, and more particularly to an improvement of a pre-emphasis function in the output section of the transmitter. For example, the differential data transmitter is used in a high-speed serial data transmission system, such as a router that handles data of about 3.2 Gbps, or a mount board that performs data transmission between LSI chips.

2. Description of the Related Art

In a high-speed serial data transmission system, it is preferable to ensure a sufficient eye pattern (the eye pattern is an opening observed at the center when overlapping signal waveforms) in a differential data signal received by a receiver on an opposite-party side. For this reason, a technique called "pre-emphasis" is applied to the output section of the transmitter on a sender side. Pre-emphasis means that signal frequency components to be attenuated are emphasized in advance by the data driver of the transmitter on the sender side. The signal frequency components are attenuated, according to the characteristics of the semiconductor device package on the sender side and the data transmission lines. With pre-emphasis, it is possible to expand the signal amplitude, thereby ensuring a sufficient eye pattern, in a differential data signal received by the receiver on the opposite-party side.

FIG. 9 is a block diagram showing the basic arrangement of the output section of a conventional differential data transmitter employed in a high-speed serial data transmission system.

This output section of a transmitter includes two pre-drivers 61 and 62 that gradually increase driving current values, a delay circuit 60, and an output driver 63 for large-current driving. The output driver 63 generates a pre-emphasis waveform signal from the output signals of the two pre-drivers 61 and 62. The output driver 63 is formed of a subtraction circuit that performs subtraction on two input signals to generate a pre-emphasis waveform signal.

In the output section of a differential data transmitter shown in FIG. 9, the serial transmission path that transmits a differential input signal (consisting of positive and negative signals) is divided into two paths STP61 and STP62 extending in parallel with each other. One STP61 of the paths is a first path (main signal path) for transmitting the data signal (serial differential signal) to the subsequent stage as it is. The other path STP62 is a second path (emphasis signal path) for transmitting a signal to be used for emphasizing the data signal (serial differential signal).

Through the first path STP61, the data signal is inputted into the output driver 63, while it is buffered and caused by the first pre-driver 61 to gradually increase its current value. In the second path STP62, the data signal is provided with a delay of a certain time by the delay circuit 60. Then, the data signal is inputted into the output driver 63, while it is buffered and caused by the second pre-driver 62 to gradually increase its current value.

Accordingly, the data signal transmitted through the second path STP62 used as a signal for emphasizing data is inputted into the output driver 63 with a delay time given by the delay circuit 60, as compared to the data signal transmitted through the first path STP61. The output driver 63 receives the output signals of the two pre-drivers 61 and 62, and performs subtraction on the two data signals to generate a differential output signal having a pre-emphasis waveform.

FIG. 10 is a signal waveform chart used for explaining the concept of pre-emphasis by subtraction, where the output driver 63 is formed of a two-input subtraction circuit.

In FIG. 10, Y1 denotes a current for driving a first differential circuit for the main signal in the output driver 63, and Y2 denotes a current for driving a second differential circuit for the emphasis signal in the output driver 63. In a period of a delay time T_Delay that begins from a change point of the data, the output currents of the two differential circuits act to reinforce each other, thereby driving with a current of Y1+Y2. By contrast, in a period until the next change point of the data after the delay time T_Delay, the output currents of the two differential circuits act to cancel each other, thereby driving with a current of Y1−Y2.

In this case, the delay time T_Delay given to the data signal (emphasis signal) transmitted through the second path STP62 does not only detect change points of data, but also determine a data pre-emphasis period.

FIGS. 11A and 11B are schematic views respectively showing conventional examples of the delay circuit 60 shown in FIG. 9.

FIG. 11A shows a buffer line on which a plurality of buffer circuits or inversion circuits are connected in series. This buffer line uses the buffer circuit or inversion circuit as delay elements connected in series to utilize propagation delay obtained by the delay elements. In this case, the number of delay elements is adjusted to set a delay time. The delay time, however, depends on the gate pattern corners of transistors used, temperature, power supply voltage, and so forth.

FIG. 11B shows a D-type flip-flop circuit (D-FF) driven by a clock signal CLK. The clock signal CLK used for the D-FF has the same frequency as the data rate of an input signal. The D-FF holds a signal for a period of time corresponding to the cycle of the clock signal CLK or a half thereof to provide the signal with a delay.

In either of the circuits shown in FIGS. 11A and 11B, the delay time T_Delay depends on the circuit arrangement, and is predetermined when designed. In other words, the data pre-emphasis period is fixed when designed. However, the optimum value of the data pre-emphasis period varies, depending on various conditions, such as the length of transmission lines, the external environment, and so forth. In this respect, since the conventional differential data transmitter has an output section in which the delay time is predetermined when designed, it is difficult to realize an optimum pre-emphasis period.

For this reason, a high-speed serial data transmission system should be provided with a differential data transmitter having an output section that can realize an optimum pre-emphasis period, depending on various conditions, such as the length of transmission lines, the external environment, and so forth, so as to expand signal amplitude on an opposite-party receiver side.

BRIEF SUMMARY OF THE INVENTION

According to a first aspect of the present invention, there is provided a differential data transmitter comprising:

a first pre-driver configured to receive a differential data signal;

a delay circuit configured to receive the differential data signal in parallel with the first pre-driver, and output the differential data signal with a delay time, the delay circuit variably setting the delay time in accordance with a control signal;

a second pre-driver configured to receive an output signal from the delay circuit; and an output driver configured to receive first and second output signals from the first and second pre-drivers, and output a pre-emphasis waveform signal that corresponds to a subtraction signal between the first and second output signals.

According to a second aspect of the present invention, there is provided a differential data transmitter-receiver apparatus comprising:

a transmitter configured to transmit a first data signal to an opposite-party differential data transmitter-receiver apparatus;

a receiver configured to receive a second data signal from the opposite-party differential data transmitter-receiver apparatus; and a control section configured to control the transmitter and the receiver, the transmitter comprising a first pre-driver configured to receive a differential data signal, a delay circuit configured to receive the differential data signal in parallel with the first pre-driver, and output the differential data signal with a delay time, the delay circuit variably setting the delay time in accordance with a control signal supplied from the control section, a second pre-driver configured to receive an output signal from the delay circuit, and an output driver configured to receive first and second output signals from the first and second pre-drivers, and output a pre-emphasis waveform signal that corresponds to a subtraction signal between the first and second output signals, wherein the control section controls the delay circuit, based on a result of monitoring an eye pattern of the second data signal received by the receiver.

DETAILED DESCRIPTION OF THE INVENTION

Figure 1:
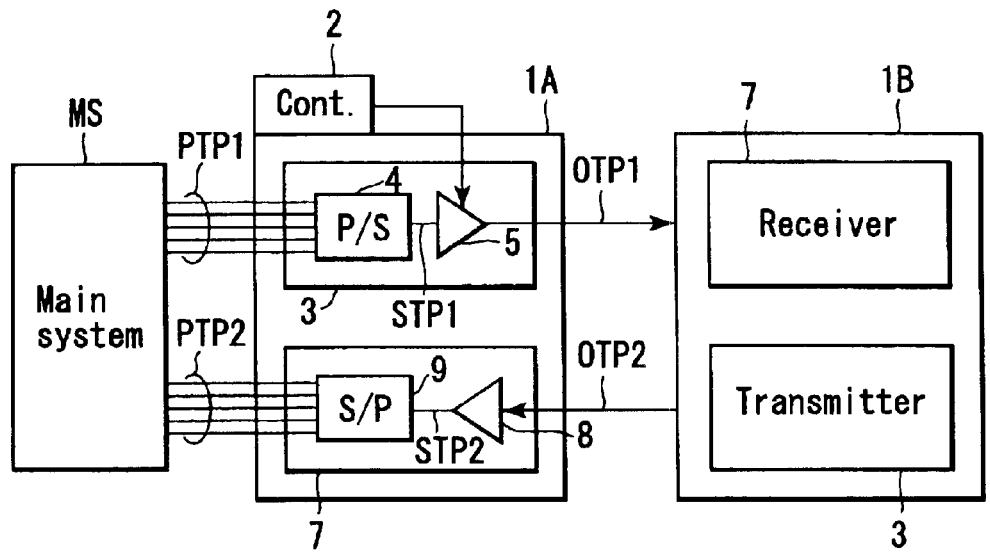
FIG. 1 is a block diagram schematically showing a high-speed serial data transmission system including a differential data transmitter-receiver apparatus according to a first embodiment of the present invention.

Embodiments of the present invention will be described hereinafter with reference to the accompanying drawings. In the following description, the constituent elements having substantially the same function and arrangement are denoted by the same reference numerals, and a repetitive description will be made only when necessary.

<First Embodiment>

FIG. 1 is a block diagram schematically showing a high-speed serial data transmission system including a differential data transmitter-receiver apparatus according to a first embodiment of the present invention. This data transmission system includes a differential data transmitter-receiver apparatus 1A according to the first embodiment, and a differential data transmitter-receiver apparatus 1B connected to the transmitter-receiver apparatus 1A through external transmission paths OTP1 and OTP2, and disposed as a communication opposite-party thereof. A detailed explanation will be given only of the differential data transmitter-receiver apparatus 1A, assuming that the differential data transmitter-receiver apparatus 1B is arranged substantially the same as the differential data transmitter-receiver apparatus 1A.

The differential data transmitter-receiver apparatus 1A has a transmitter 3 and a receiver 7 connected to a main system MS, such as a semiconductor device, through parallel transmission paths PTP1 and PTP2, and a control section 2 for controlling them. The transmitter 3 is proved with a parallel-serial converter 4 and an output section 5 connected to each other through a serial transmission path STP1. The receiver 7 is provided with an input section 8 and a serial-parallel converter 9 connected to each other through a serial transmission path STP2.

In the transmitter 3, a parallel differential signal from the main system MS is converted into a serial differential signal by the converter 4. The serial differential signal is shaped into a pre-emphasis waveform signal by the output section 5, as described later, and is transmitted toward the opposite-party or differential data transmitter-receiver apparatus 1B. On the other hand, a serial differential signal (pre-emphasis waveform signal) sent from the opposite-party or differential data transmitter-receiver apparatus 1B is received by the input section 8 of the receiver 7. The serial differential signal is converted into a parallel differential signal by the converter 9, and is transmitted toward the main system MS.

When generating a pre-emphasis waveform signal in the output section 5 of the transmitter 3, the control section 2 can control the output section 5 (more specifically a delay circuit 15 described later), on the basis of a result of monitoring the eye pattern of a signal received by the receiver 7. With this operation, it is possible to realize an optimum value of a pre-emphasis period for generating a pre-emphasis waveform signal to be transmitted from the output section 5, thereby expanding the signal amplitude on the opposite-party side in an optimum manner.

Figure 2:
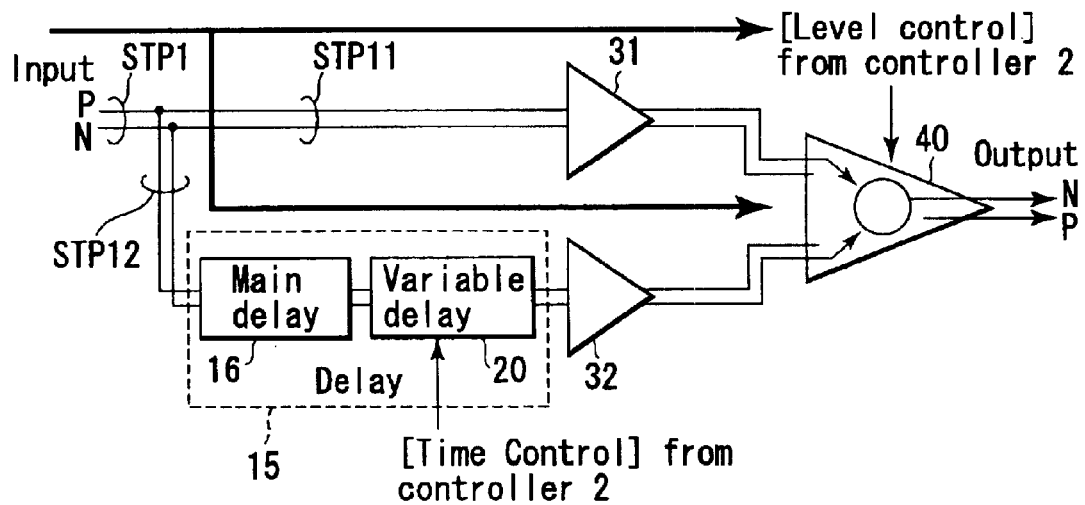
FIG. 2 is a block diagram showing the output section of a transmitter employed in the transmitter-receiver apparatus shown in FIG. 1.

FIG. 2 is a block diagram showing the output section 5 of the transmitter 3 employed in the transmitter-receiver apparatus 1A. The output section 5 includes two pre-drivers 31 and 32 that gradually increase driving current values, a delay circuit 15, and an output driver 40 for large-current driving. The two pre-drivers 31 and 32 have the same circuit arrangement. The output driver 40 generates a pre-emphasis waveform signal from the output signals of the two pre-drivers 31 and 32. The output driver 40 is formed of a subtraction circuit that performs subtraction on two input signals to generate a pre-emphasis waveform signal.

The serial transmission path STP1 from the parallel-serial converter 4 is divided into two paths STP11 and STP12 extending in parallel with each other. One STP11 of the paths is a first path (main signal path) for transmitting the data signal (serial differential signal) to the subsequent stage as it is. The other path STP12 is a second path (emphasis signal path) for transmitting a signal to be used for emphasizing the data signal (serial differential signal).

Through the first path STP11, the data signal is inputted into the output driver 40, while it is buffered and caused by the first pre-driver 31 to gradually increase its current value. In the second path STP12, the data signal is provided with a delay of a certain time by the delay circuit 15. Then, the data signal is inputted into the output driver 40, while it is buffered and caused by the second pre-driver 32 to gradually increase its current value.

As described above, the first and second pre-drivers 31 and 32 have the same circuit arrangement. Since the first and second pre-drivers 31 and 32 have the same delay time, the data signal transmitted through the second path STP12 is inputted into the output driver 40 with a delay time given by the delay circuit 15, as compared to the data signal transmitted through the first path STP11. The output driver 40 receives the output signals of the two pre-drivers 31 and 32, and performs subtraction on the two data signals to generate a differential output signal having a pre-emphasis waveform. The two pre-derivers 31 and 32 need not necessarily have the same circuit structure, if they have the same delay time. Furthermore, even if the two pre-drivers 31 and 32 have different delay times, the delay circuit 15 absorbs this difference, thereby resulting in no problem.

Figure 3:
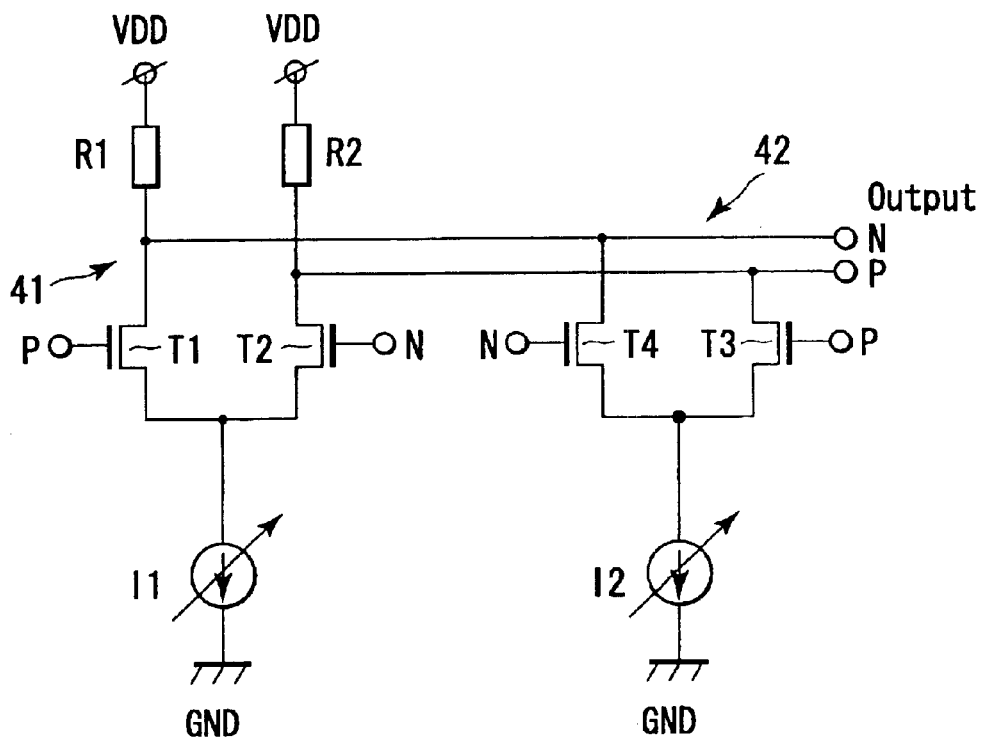
FIG. 3 is a circuit diagram showing the output driver of the output section shown in FIG. 2.

FIG. 3 is a circuit diagram showing the output driver 40 of the output section 5, which is formed of a subtraction circuit. The output driver (two-input subtraction circuit) 40 shown in FIG. 3 includes first and second differential circuits 41 and 42 connected to its output, in parallel with each other. The first differential circuit 41 and second differential circuit 42 are arranged such that their positive and negative outputs are connected in reverse to each other, so as to generate an output signal of subtraction in current.

More specifically, the first differential circuit 41 includes first and second MOS transistors T1 and T2. The first and second MOS transistors T1 and T2 respectively have gates to be supplied with the positive signal and negative signal of the data signal (main signal) transmitted through the first path STP11. The first and second MOS transistors T1 and T2 share a source connection node to which a first current circuit 11 is connected. The first and second MOS transistors T1 and T2 have drains to which load circuits R1 and R2 are connected, respectively.

The second differential circuit 42 includes third and fourth MOS transistors T3 and T4. The third and fourth MOS transistors T3 and T4 respectively have gates to be supplied with the positive signal and negative signal of the data signal (emphasis signal) transmitted through the second path STP12. The third and fourth MOS transistors T3 and T4 share a source connection node to which a second current circuit 12 is connected. The third and fourth MOS transistors T3 and T4 have drains to which the load circuits R1 and R2 described above are connected, respectively.

In the arrangement described above, the output driver 40 subtracts the data signal (emphasis signal) transmitted through the second path STP12, from the data signal (main signal) transmitted through the first path STP11. As a consequence, a change point of the data from "H" to "L" or from "L" to "H" is emphasized, while a portion of the data corresponding to a continuation of "H" or "L" is weakened. In other words, this arrangement emphasizes high frequency components of the signal that are attenuated by the transmission lines and so forth, and weakens low frequency components of the signal that are not attenuated.

The delay circuit 15 for pre-emphasis has a main delay circuit 16 and a variable delay circuit 20 connected to each other in series on the second path STP12. The main delay circuit 16 provides the data signal with a fixed delay time that is fixed at a predetermined value. On the other hand, the variable delay circuit 20 provides the data signal with a delay time that is variable in accordance with a control signal supplied from the control section 2 (see FIG. 1). The variable delay circuit 20 can provide the data signal with an optimum delay to realize an optimum pre-emphasis period.

Figure 4:
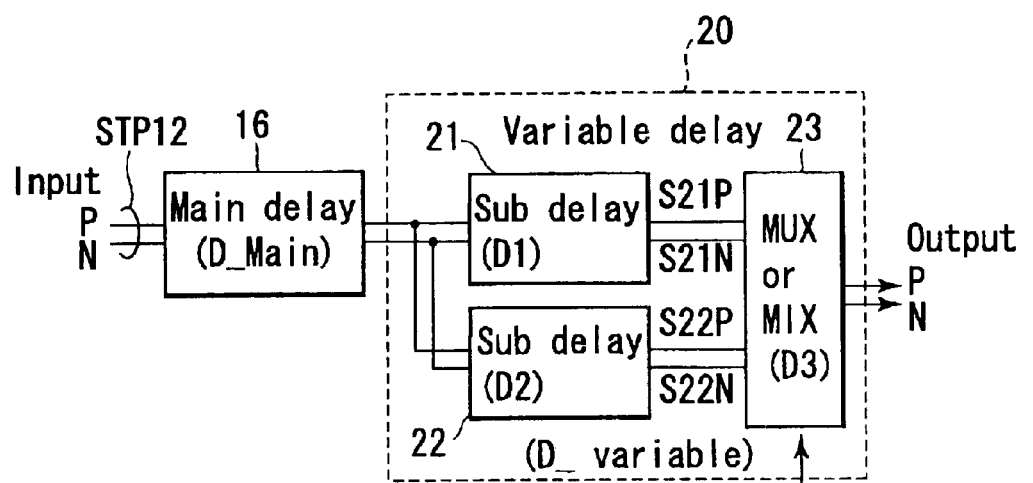
FIG. 4 is a block diagram showing the main delay circuit and variable delay circuit of the output section shown in FIG. 2.
Figure 11A:
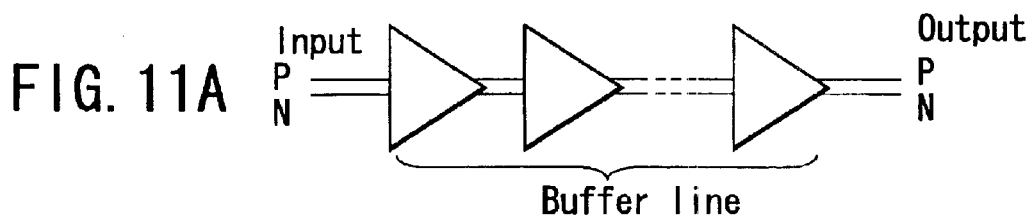
FIGS. 11A and 11B are schematic views respectively showing conventional examples of the delay circuit shown in FIG. 9.
Figure 11B:
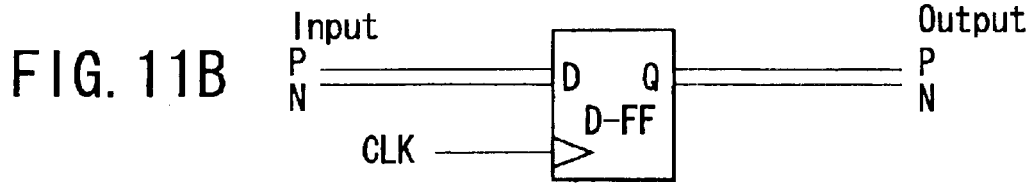

FIG. 4 is a block diagram showing the main delay circuit 16 and variable delay circuit 20 of the output section 5. The main delay circuit 16 has an arrangement similar to the conventional delay circuit shown in FIG. 11A or 11B. The main delay circuit 16, however, is designed to give a delay time that is shorter by a delay time to be added by the variable delay circuit 20.

The variable delay circuit 20 includes two sub delay circuits 21 and 22 and a delay output circuit 23. The sub delay circuits 21 and 22 are connected to the main delay circuit 16, in parallel with each other, and provide the data signal from the main delay circuit 16 with different signal delays. The delay output circuit 23 receives first and second sub output signals S21 and S22 from the first and second sub delay circuits 21 and 22, and selectively uses them to set a delay time.

More specifically, the delay output circuit 23 can set a mixing ratio of the first and second sub output signals S21 and S22, in accordance with an external control signal (Time Control) supplied from the control section 2 (see FIG. 1). For example, the delay output circuit 23 has a signal selection (MUX) function to select and output either one of the first and second sub output signals S21 and S22 (i.e., in this case, the mixing ratio is set to be 100% for one signal and 0% for the other). The delay output circuit 23 also has a signal mixture (MIX) function to mix and output the first and second sub output signals S21 and S22 at a desired ratio. Each of the sub delay circuit circuits 21 and 22 and delay output circuit 23 is formed of, e.g., a current mode logic (CML) that is driven by a constant current.

Figure 5:
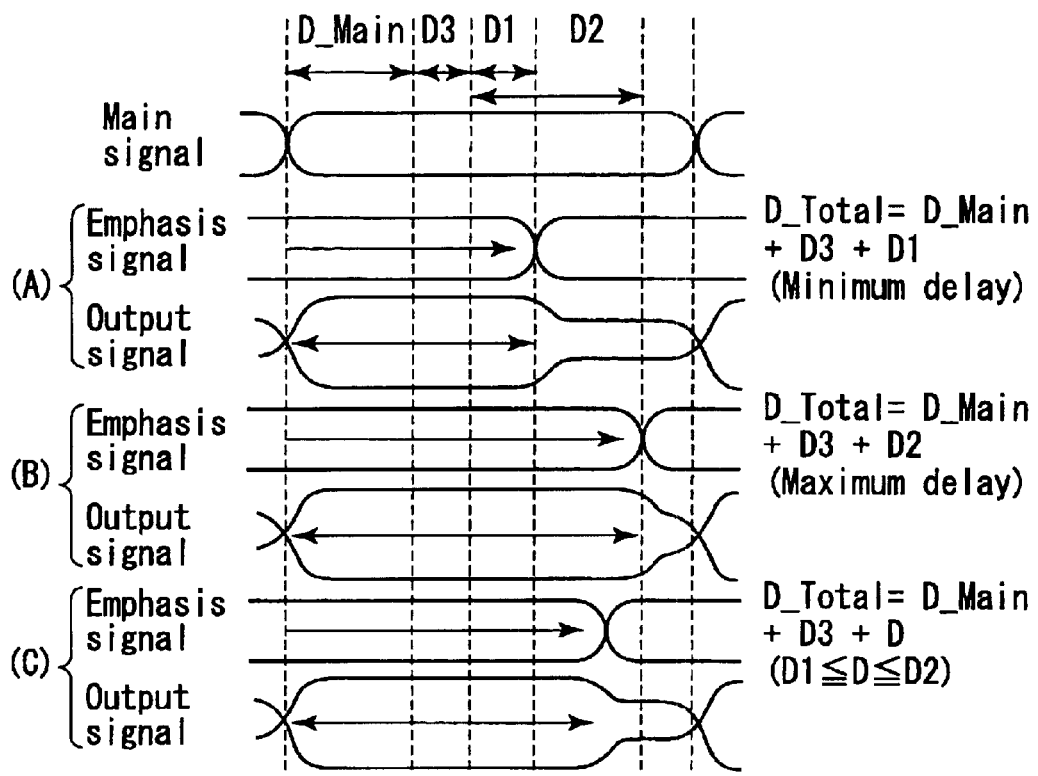
FIG. 5 is a signal waveform chart showing an example of an operation performed in the output section of the transmitter of the transmitter-receiver apparatus shown in FIG. 1.

FIG. 5 is a signal waveform chart showing an example of an operation performed in the output section 5 of the transmitter 3. An explanation will be given of an operation of the variable delay circuit 20 (change in delay) and an operation of the circuit shown in FIG. 2, with reference to FIG. 5.

As shown in FIG. 4, the data signal (differential signal) transmitted through the second path STP12 is provided with a delay of a certain time (D_Main≧0) by the main delay circuit 16. Then, the differential input signal is inputted into the variable delay circuit 20.

In the variable delay circuit 20, the data signal is divided into two parts, which are then respectively inputted into the first and second sub delay circuits 21 and 22 arranged in parallel with each other. The divided parts of the data signal are provided with different delays of time (D1≧0, D2>0, D1<D2) by the sub delay circuits 21 and 22, and outputted as first and second sub output signals S21 and S22. It should be noted that, since each of the first and second sub output signals S21 and S22 is a differential signal, the first sub output signal S21 consists of positive and negative signals S21P and S21N, and the second sub output signal S22 consists of positive and negative signals S22P and S22N.

The delay output circuit 23 receives the first and second sub output signals S21 and S22, and selectively uses them to set a delay time. The delay output circuit 23 sets a mixing ratio of the first and second sub output signals S21 and S22 (including the case of alternative use), in accordance with the external control signal (Time Control) supplied from the control section 2 (see FIG. 1).

Accordingly, the variable delay circuit 20 provides the data signal (differential input signal) with a desired delay (D_variable)=D (D1≦D≦D2)+D3 (D3>0). As a consequence, the circuit shown in FIG. 4 provides the differential signal transmitted through the second path STP12 with a total delay (D_Total), which is expressed by the following formula:

$$D\_total = D\_Main + D\_Variable = D\_Main + D(D1 \leq D \leq D2) + D3.$$

Where D=D1 is satisfied, D_total takes on the minimum value (Minimum Delay). Where D=D2 is satisfied, D_total takes on the maximum value (Maximum Delay). Where D1<D<D2 is satisfied, D_total takes on a medium value. In accordance with D_total being the minimum value, the maximum value, and a medium value, the pre-emphasis period is set at the minimum, the maximum, and a medium, respectively.

Next, a detailed explanation will be given of concrete examples of the sub delay circuits 21 and 22 and delay output circuit 23. Each of these circuits is formed of, e.g., a current mode logic (CML) that is driven by a constant current.

Figure 6:
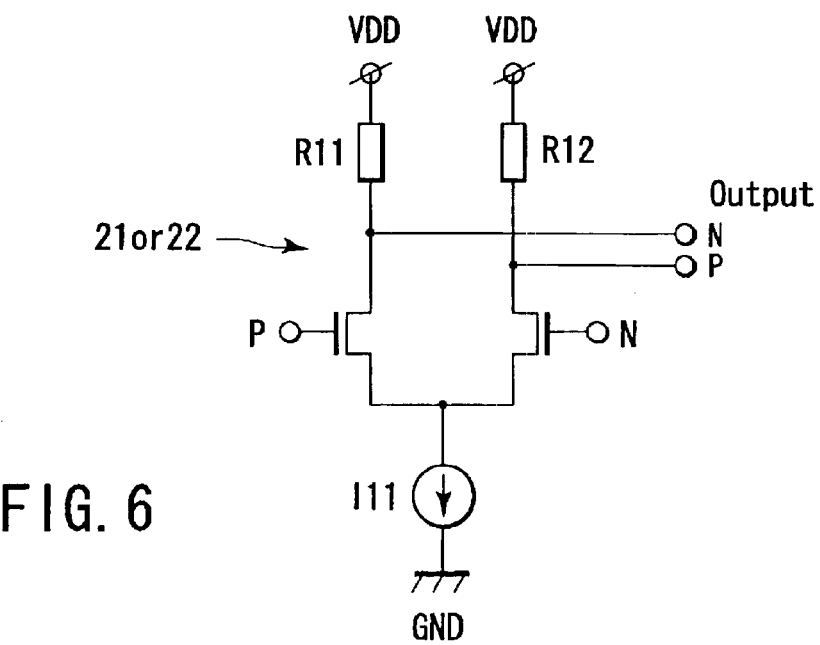
FIG. 6 is a circuit diagram showing one of sub delay circuits employed in the variable delay circuit shown in FIG. 4.

FIG. 6 is a circuit diagram showing one of the two sub delay circuits 21 and 22. This sub delay circuit is formed of a differential circuit of the MOS source connection type with a constant current source 111 connected thereto, and receives a differential input signal (data signal).

More specifically, this differential circuit includes first and second MOS transistors T11 and T12. The first and second MOS transistors T11 and T12 respectively have gates to be supplied with the positive signal and negative signal of the data signal outputted from the main delay circuit 16. The first and second MOS transistors T11 and T12 share a source connection node to which the constant current source 111 is connected. The first and second MOS transistors T11 and T12 have drains to which load circuits R11 and R12 are connected, respectively.

Figure 7:
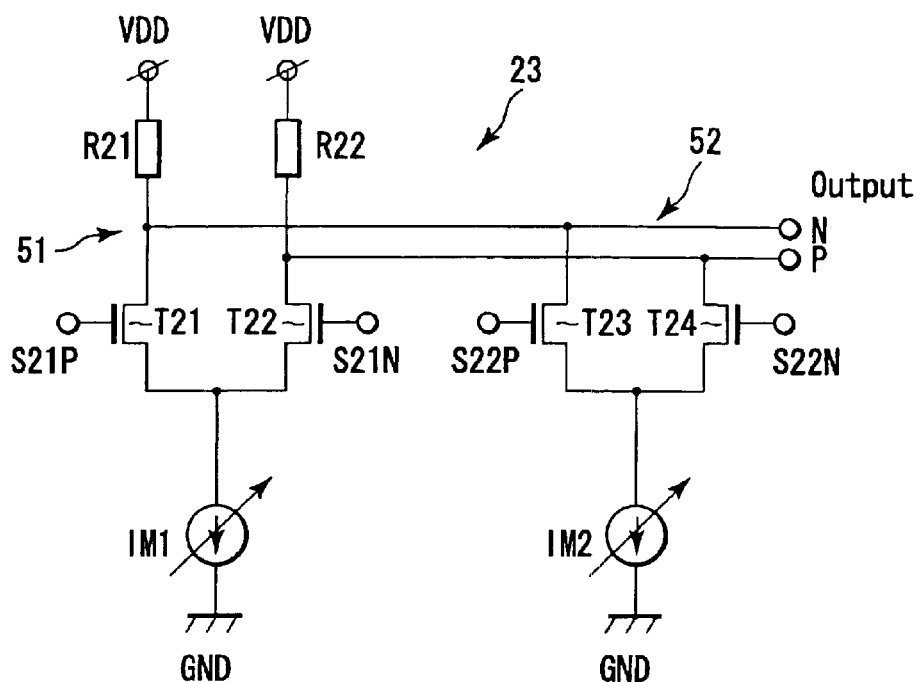
FIG. 7 is a circuit diagram showing a delay output circuit employed in the variable delay circuit shown in FIG. 4.

FIG. 7 is a circuit diagram showing the delay output circuit 23. The delay output circuit 23 includes first and second differential circuits 51 and 52 connected to its output, in parallel with each other. The first differential circuit 51 and second differential circuit 52 are arranged such that their positive and negative outputs are connected in correspondence to each other.

More specifically, the first differential circuit 51 includes first and second MOS transistors T21 and T22. The first and second MOS transistors T21 and T22 respectively have gates to be supplied with the positive signal S21P and negative signal S21N of the first sub output signal S21 outputted from the first sub delay circuit 21. The first and second MOS transistors T21 and T22 share a source connection node to which a first variable current source IM1 is connected. The first and second MOS transistors T21 and T22 have drains to which load circuits R21 and R22 are connected, respectively.

The second differential circuit 52 includes third and fourth MOS transistors T23 and T24. The third and fourth MOS transistors T23 and T24 respectively have gates to be supplied with positive signal S22P and negative signal S22N of the second sub output signal S22 outputted from the second sub delay circuit 22. The third and fourth MOS transistors T23 and T24 share a source connection node to which a second variable current source IM2 is connected. The third and fourth MOS transistors T23 and T24 have drains to which the load circuits R21 and R22 described above are connected, respectively.

The first and second variable current sources IM1 and IM2 are controlled, in accordance with the external control signal (Time Control) supplied from the control section 2 (see FIG. 1). In accordance with the external control signal, current flows supplied to the first and second variable current sources IM1 and IM2 are controlled, thereby setting a mixing ratio of the first and second sub output signals S21 and S22. For example, under this current control, the delay output circuit 23 can realize a signal selection (MUX) function to select and output either one of the first and second sub output signals S21 and S22 (i.e., in this case, the mixing ratio is set to be 100% for one signal and 0% for the other). Furthermore, under this current control, the delay output circuit 23 can realize a signal mixture (MIX) function to mix and output the first and second sub output signals S21 and S22 at a desired ratio.

More specifically, by setting the driving current IM1 of the first variable current source IM1 and the driving current IM2 of the second variable current source IM2, the delay output circuit 23 operates as follows. In this case, it is assumed that a relationship "IM1+IM2=I=constant" is satisfied.

(A) Where IM1=I and IM2=0, D_Total takes on the minimum (D_min).

(B) Where IM1=0 and IM2=I, D_Total takes on the maximum (D_max).

(C) Where IM1=i and IM2=I−i, D_Total takes on a value between the D_min and D_max, while being controlled in accordance with the magnitude relation between IM1 and IM2.

In other words, when IM1 and IM2 are controlled such that only one of them is supplied, as in the case (A) or (B) described above, the delay output circuit 23 operates as a signal selection (MUX) circuit. On the other hand, when IM1 and IM2 are controlled such that they are supplied to satisfy IM1+IM2=I, as in the case (C) described above, the delay output circuit 23 operates as a signal mixture (MIX) circuit.

Furthermore, the control section 2 (see FIG. 1) can control the first and second variable current sources IM1 and IM2 of the delay output circuit 23, on the basis of a result of monitoring the eye pattern of a signal that is received by the input section 8 of the receiver 7. As a consequence, it is possible to set an optimum mixing ratio of the first and second sub output signals S21 and S22, which corresponds to a delay time for setting an optimum pre-emphasis period in the data transmission system. A signal to be monitored may be a signal that has been transmitted from the transmitter 3, received by the differential data transmitter-receiver apparatus 1B on the opposite-party side, and returned to the receiver 7.

Figure 8:
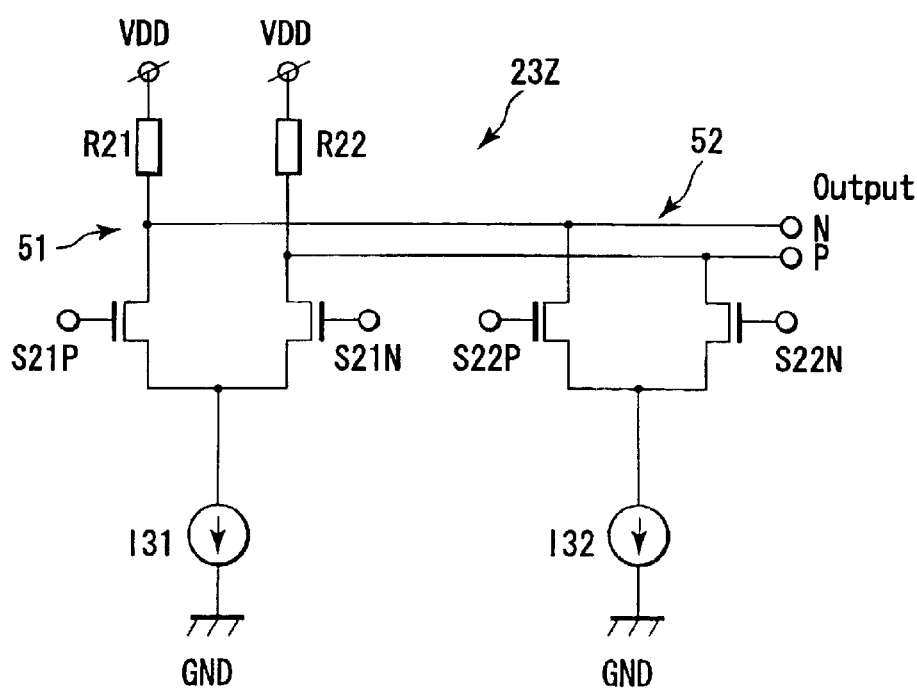
FIG. 8 is a circuit diagram showing a modification of the delay output circuit shown in FIG. 7.
Figure 9:
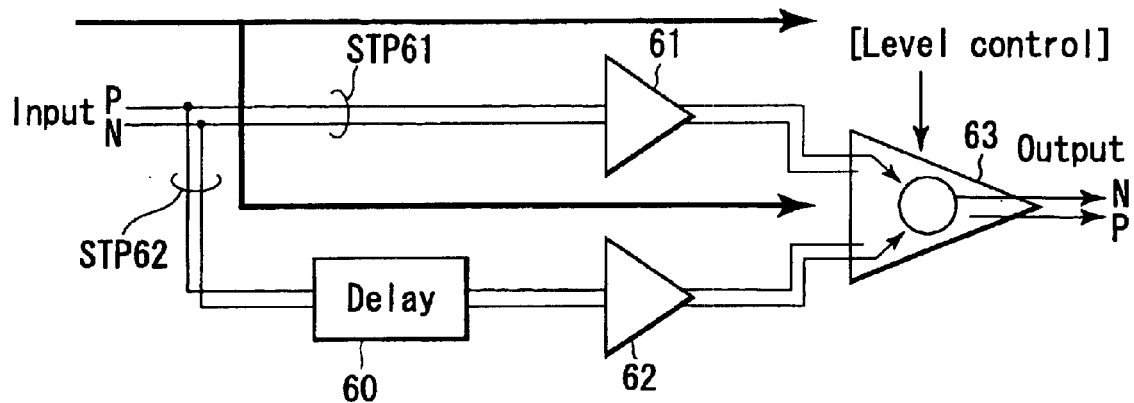
FIG. 9 is a block diagram showing the basic arrangement of the output section of a conventional differential data transmitter employed in a high-speed serial data transmission system.
Figure 10:
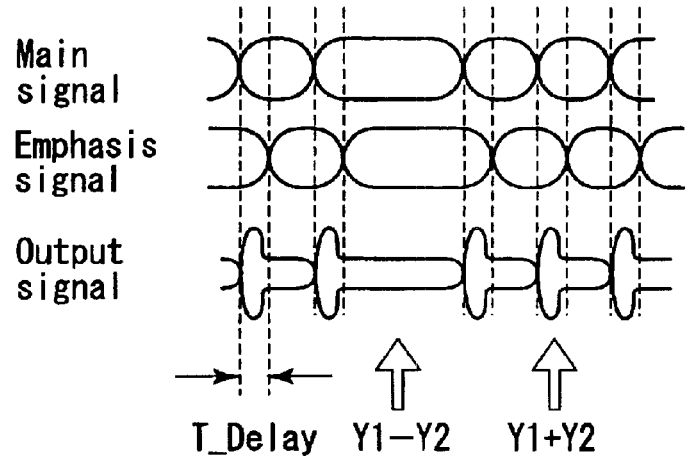
FIG. 10 is a signal waveform chart used for explaining the concept of pre-emphasis by subtraction in a two-input subtraction circuit.

FIG. 8 is a circuit diagram showing a modification of the delay output circuit. The delay output circuit 23Z according to this modification operates only as a signal selection (MUX) circuit. In this case, the delay output circuit 23Z includes first and second constant current sources I31 and I32 in place of the first and second variable current sources IM1 and IM2 shown in FIG. 7. The first and second constant current sources I31 and I32 are tuned on/off in accordance with the external control signal (Time Control) supplied from the control section 2 (see FIG. 1). As a consequence, the delay output circuit 23Z realizes a signal selection (MUX) function to select and output either one of the first and second sub output signals S21 and S22.

Using a differential data transmitter-receiver apparatus for a high-speed serial data transmission system according to the embodiments shown in FIGS. 1 to 8, it is possible to realize an optimum pre-emphasis period, depending on various conditions, such as the length of transmission lines, the external environment, and so forth, so as to expand signal amplitude on an opposite-party receiver side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A differential data transmitter comprising:
   a first pre-driver configured to receive a differential data signal;
   a delay circuit configured to receive the differential data signal in parallel with the first pre-driver, and output the differential data signal with a delay time, the delay circuit variably setting the delay time in accordance with a control signal;
   a second pre-driver configured to receive an output signal from the delay circuit; and
   an output driver configured to receive first and second output signals from the first and second pre-drivers, and output a pre-emphasis waveform signal that corresponds to a subtraction signal between the first and second output signals.

2. The transmitter according to claim 1, wherein the delay circuit comprises
   first and second sub delay circuits configured to receive the differential data signal in parallel with each other, the first and second sub delay circuits providing signal delays different from each other, and
   a delay output circuit configured to receive first and second sub output signals from the first and second sub delay circuits, and selectively use the first and second sub output signals to set the delay time.

3. The transmitter according to claim 2, wherein the delay output circuit selectively outputs one of the first and second sub output signals.

4. The transmitter according to claim 2, wherein the delay output circuit mixes and outputs the first and second sub output signals at a certain ratio.

5. The transmitter according to claim 2, wherein each of the first and second sub delay circuits comprises a differential circuit including two MOS transistors, the two MOS transistors respectively have gates to be respectively supplied with positive and negative signals of the differential data signal, the two MOS transistors share a source connection node to which a constant current circuit is connected, and the two MOS transistors have drains to which load circuits are respectively connected.

6. The transmitter according to claim 2, wherein the delay output circuit comprises first and second differential circuits connected to an output thereof, in parallel with each other,
   the first differential circuit comprises first and second MOS transistors, the first and second MOS transistors respectively have gates to be respectively supplied with positive and negative signals of the first sub output signal, the first and second MOS transistors share a source connection node to which a first current circuit is connected, and the first and second MOS transistors have drains to which load circuits are respectively connected, and
   the second differential circuit comprises third and fourth MOS transistors, the third and fourth MOS transistors respectively have gates to be respectively supplied with positive and negative signals of the second sub output signal, the third and fourth MOS transistors share a source connection node to which a second current circuit is connected, and the third and fourth MOS transistors have drains to which the load circuits are respectively connected.

7. The transmitter according to claim 6, wherein a current value is controllable in accordance with the control signal in one or both of the first and second current circuits.

8. The transmitter according to claim 1, further comprising another delay circuit connected to the delay circuit in series and configured to provide an input signal with a fixed delay time.

9. The transmitter according to claim 1, wherein the differential signal is a serial differential signal.

10. The transmitter according to claim 9, further comprises a parallel-serial converter configured to receive a parallel differential signal and output the serial differential signal.

11. A differential data transmitter-receiver apparatus comprising:
   a transmitter configured to transmit a first data signal to an opposite-party differential data transmitter-receiver apparatus;
   a receiver configured to receive a second data signal from the opposite-party differential data transmitter-receiver apparatus; and
   a control section configured to control the transmitter and the receiver,
   the transmitter comprising
   a first pre-driver configured to receive a differential data signal,
   a delay circuit configured to receive the differential data signal in parallel with the first pre-driver, and output the differential data signal with a delay time, the delay circuit variably setting the delay time in accordance with a control signal supplied from the control section,
   a second pre-driver configured to receive an output signal from the delay circuit, and
   an output driver configured to receive first and second output signals from the first and second pre-drivers, and output a pre-emphasis waveform signal that corresponds to a subtraction signal between the first and second output signals, wherein the control section controls the delay circuit, based on a result of monitoring an eye pattern of the second data signal received by the receiver.

12. The transmitter-receiver apparatus according to claim 11, wherein the second data signal is derived from the first data signal, which has been received by the opposite-party differential data transmitter-receiver apparatus and returned to the receiver.

13. The transmitter-receiver apparatus according to claim 11, wherein each of the differential signal and the first and second data signal is a serial differential signal.

14. The transmitter-receiver apparatus according to claim 13, wherein the transmitter and the receiver respectively comprise a parallel-serial converter and a serial-parallel converter.

15. The transmitter-receiver apparatus according to claim 11, wherein the delay circuit comprises first and second sub delay circuits configured to receive the differential data signal in parallel with each other, the first and second sub delay circuits providing signal delays different from each other, and a delay output circuit configured to receive first and second sub output signals from the first and second sub delay circuits, and selectively use the first and second sub output signals to set the delay time.

16. The transmitter-receiver apparatus according to claim 15, wherein the delay output circuit selectively outputs one of the first and second sub output signals.

17. The transmitter-receiver apparatus according to claim 15, wherein the delay output circuit mixes and outputs the first and second sub output signals at a certain ratio.

18. The transmitter-receiver apparatus according to claim 11, further comprising another delay circuit connected to the delay circuit in series and configured to provide an input signal with a fixed delay time.

\* \* \* \* \*